United States Patent
Albright et al.

(10) Patent No.: US 10,984,637 B2
(45) Date of Patent: Apr. 20, 2021

(54) HAPTIC CONTROL INTERFACE FOR DETECTING CONTENT FEATURES USING MACHINE LEARNING TO INDUCE HAPTIC EFFECTS

(71) Applicant: NVIDIA Corporation, Santa Clara, CA (US)

(72) Inventors: Ryan Albright, Beaverton, OR (US); Mike Gemelke, Portland, OR (US); Jordan Levy, Beaverton, OR (US); Ben Goska, Portland, OR (US); Marc Davis, Hillsboro, OR (US); Siddardha Naraharisetti, San Jose, CA (US); Ankita Garg, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/581,046

(22) Filed: Sep. 24, 2019

(65) Prior Publication Data

US 2021/0090410 A1    Mar. 25, 2021

(51) Int. Cl.
| | |
|---|---|
| G08B 6/00 | (2006.01) |
| G06K 9/62 | (2006.01) |
| G06N 3/08 | (2006.01) |
| G06F 3/041 | (2006.01) |
| G06F 3/01 | (2006.01) |

(52) U.S. Cl.
CPC ............... *G08B 6/00* (2013.01); *G06F 3/016* (2013.01); *G06F 3/0416* (2013.01); *G06K 9/6259* (2013.01); *G06N 3/08* (2013.01)

(58) Field of Classification Search
CPC .......... G08B 6/00; G06K 9/6259; G06N 3/08; G06F 3/016; G06F 3/0416
See application file for complete search history.

(56) References Cited

U.S. PATENT DOCUMENTS

| | | | |
|---|---|---|---|
| 10,216,277 B2* | 2/2019 | Rihn | G11B 27/11 |
| 10,222,889 B2* | 3/2019 | Picciotto | G06F 3/04166 |
| 2006/0200746 A1* | 9/2006 | Kim | H04H 60/31 |
| | | | 715/234 |
| 2007/0060233 A1* | 3/2007 | Liccardo | A63F 13/12 |
| | | | 463/8 |
| 2016/0202760 A1* | 7/2016 | Churikov | A63F 13/285 |
| | | | 345/173 |

(Continued)

OTHER PUBLICATIONS

Razer, "The Next Level of Gaming Immersion," Razer Inc., 2019, 6 pages, retrieved on Sep. 24, 2019 from https://www.razer.com/campaigns/razer-hypersense.

*Primary Examiner* — Thomas D Alunkal
(74) *Attorney, Agent, or Firm* — Zilka-Kotab, P.C.

(57) ABSTRACT

Haptic effects have long been provided to enhance content, such as by providing vibrations, rumbles, etc. in a remote controller or other device being used by a user while watching or listening to the content. To date, haptic effects have either been provided by programming controls for the haptic effects within the content itself, or by providing an interface to audio that simply maps certain haptic effects with certain audio frequencies. The present disclosure provides a haptic control interface that intelligently induces haptic effects for content, in particular by using machine learning to detect specific features in content and then induce certain haptic effects for those features.

21 Claims, 9 Drawing Sheets

(56) References Cited

U.S. PATENT DOCUMENTS

2017/0104713 A1\* 4/2017 Agarwal ............... H04L 61/605
2019/0045296 A1\* 2/2019 Ralph .................. H04R 1/2807
2019/0083886 A1\* 3/2019 Taylor .................... A63F 13/54

\* cited by examiner

HAPTIC CONTROL INTERFACE FOR DETECTING CONTENT FEATURES USING MACHINE LEARNING TO INDUCE HAPTIC EFFECTS

TECHNICAL FIELD

The present disclosure relates to inducing haptic effects in haptic enabled devices.

BACKGROUND

Video games have long been enhanced using haptics in remote controllers. For example, remote controllers have been configured to vibrate or rumble in connection with events occurring in video games. However, these haptic effects have traditionally been controlled by the video games itself. In particular, the video game program is generally pre-programmed to induce certain haptic effects at certain points during the program execution. As a result, the haptic effects experienced by a player have generally been limited to those pre-programmed by the video game developer. Moreover, for video games without any pre-programmed instructions to induce haptic effects, these haptic effects are usually not available to the player.

Some new systems have aimed to expand the use of haptic effects by providing an interface to audio content (e.g. audio of a video game, audio of a song, audio of a movie, etc.) that analyzes the audio signals output by the audio content and converts the audio signals to haptic commands. For these new systems, the haptic commands typically control the haptic effects provided in a device of a user, such as headphones worn by the user to listen to the audio content. However, these new systems are limited by very simply correlating certain audio signals (e.g. frequencies) with certain haptic effects.

There is a need for addressing these issues and/or other issues associated with the prior art.

SUMMARY

A method, computer readable medium, and system are disclosed to provide a haptic control interface for detecting content features using machine learning to induce haptic effects. The haptic control interface interfaces a content source and a haptic enabled device. In use, the haptic control interface receives a portion of content and processes the portion of content using a machine learning algorithm to detect a feature of the content. Further, the haptic control interface determines one or more haptic effects for the feature and causes the haptic enabled device to exhibit the one or more haptic effects determined for the feature.

DETAILED DESCRIPTION

Haptic effects have long been provided to enhance content, such as by providing vibrations, rumbles, etc. in a remote controller or other device being used by a user while watching or listening to the content. To date, haptic effects have either been provided by programming controls for the haptic effects within the content itself, or by providing an interface to audio that simply maps certain haptic effects with certain audio frequencies. The present disclosure provides a haptic control interface that intelligently induces haptic effects for content, in particular by using machine learning to detect specific features in content and then induce certain haptic effects for those features.

Figure 1:
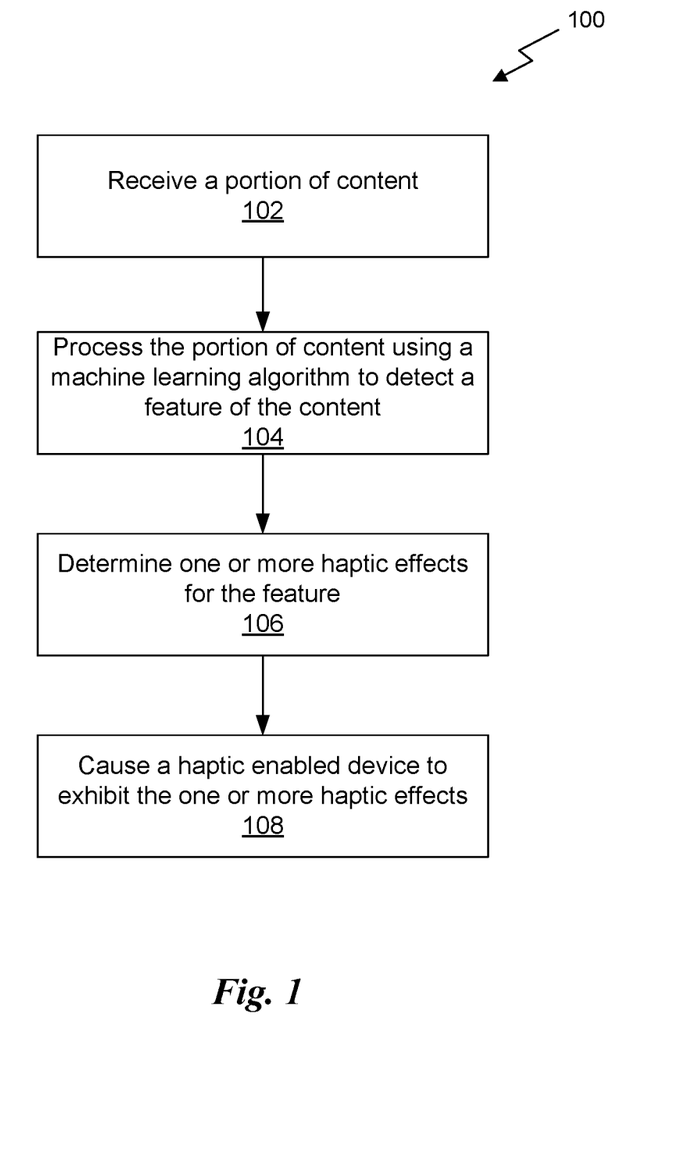
FIG. 1 illustrates a flowchart of a method of a haptic control interface for detecting content features using machine learning to induce haptic effects, in accordance with an embodiment.

FIG. 1 illustrates a flowchart of a method 10 of a haptic control interface for detecting content features using machine learning to induce haptic effects, in accordance with an embodiment. The method 100 may be performed the context of a processing unit and/or by a program, custom circuitry, or by a combination of custom circuitry and a program. For example, the method 100 may be executed by a GPU (graphics processing unit), CPU (central processing unit), or any processor described below. Furthermore, persons of ordinary skill in the art will understand that any system that performs method 100 is within the scope and spirit of embodiments of the present disclosure.

In operation 102, a portion of content is received. The content may be audio content (e.g. a song, audio book, etc.), video content (e.g. a video game, a movie, etc.) or any combination thereof. In the present description, the portion of content may refer to any subpart of the content, such as only an audio or video segment of the content. Just by way of example the received portion of the content may be an audio portion of combined audio/video content, a video portion of combined audio/video content, a particular audio channel of audio, etc.

In an embodiment, the portion of content is received from a content source. For example, the content source may be a computer system outputting the content to a display and/or speaker for viewing/listening by a user. In an embodiment, the content source may be configured to provide the portion of content to the haptic control interface. In another embodiment, the haptic control interface may intercept the portion of content (e.g. directly from the content source, or as output by the display and/or speaker).

In operation 104, the portion of content is processed using a machine learning algorithm to detect a feature of the content. In the present description, the machine learning algorithm may refer to a deep learning algorithm, neural network, artificial intelligence (AI) network, or any other type of machine learning algorithm. The machine learning algorithm may in any case be operable to detect content features from a received portion of content. The feature may be an event within the content, such as glass breaking, gunshots, footsteps, explosions, or any other action, circumstance, etc. within the content.

In an embodiment, the machine learning algorithm is initially trained using training data. The training data may provide a predefined correlation between characteristics of content, such as audio signals, video images, video objects, etc. and particular features of the content. Accordingly, the training data can be used to set up the machine learning algorithm for which the inferences as to the particular features of the content can be made. In an embodiment, the training/learning may be performed during various rounds of video game play or other user consumption of content. As an option, the machine learning algorithm may also be trained to detect a feature of the content based on a context of the content, such as a type of the content (e.g. game, etc.), genre of the content, or the particular content (e.g. particular game) from which the portion of the content is received. Once trained, the machine learning algorithm may be used in operation 104 to: receive the portion of content as input, process the portion of content to detect a feature of the content, and output the detected feature.

In operation 106, one or more haptic effects are determined for the feature. In an embodiment, the haptic effect(s) may be predefined for the feature (e.g. in a library, etc.), and thus determined by querying the haptic effect(s) for the detected feature. The haptic effect(s) may each be specified according to multiple parameters. In an embodiment, the parameters may include a type of haptic effect, such as a rumble, vibration, etc. In an embodiment, the parameters may include a duration for the haptic effect. In an embodiment, the parameters may include a location for the haptic effect, for example by specifying a particular haptic enabled device (e.g. when there are two or more haptic enabled devices being used by the user to view, hear, or interact with the content), specifying a particular haptic motor of the haptic enabled device (e.g. such as a right or left haptic motor in a remote controller, a right or left haptic motor in headphones, etc.).

In operation 108, a haptic enabled device is caused to exhibit the one or more haptic effects determined for the feature. As noted above, the device may be a remote controller, headphones, or any other device with a controllable haptic motor. In an embodiment, a haptic command or other signal may be sent to the particular haptic motor to cause the particular haptic motor to provide the haptic effect(s). Of course, in the same way, multiple devices being used by the user to view, hear, or interact with the content may also be caused to exhibit the one or more haptic effects determined for the feature.

In an embodiment, the haptic enabled device may be caused to exhibit the haptic effect(s) in conjunction with the feature of the content being output to the user. For example, the haptic command or other signal may be sent to the haptic enabled device when the feature of the content is output to the user. Thus, the haptic control interface may ensure that the haptic effect(s) provided to the user coincide with the detected feature being output to the user.

To this end, the method 100 may be repeated for each sequential portion of the content, such that haptic effects may be induced based on features detected in the content by the machine learning algorithm. This may enable the haptic effects to be intelligently provided for various types of content consumed by a user, even when the content is not preprogrammed with haptic controls.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
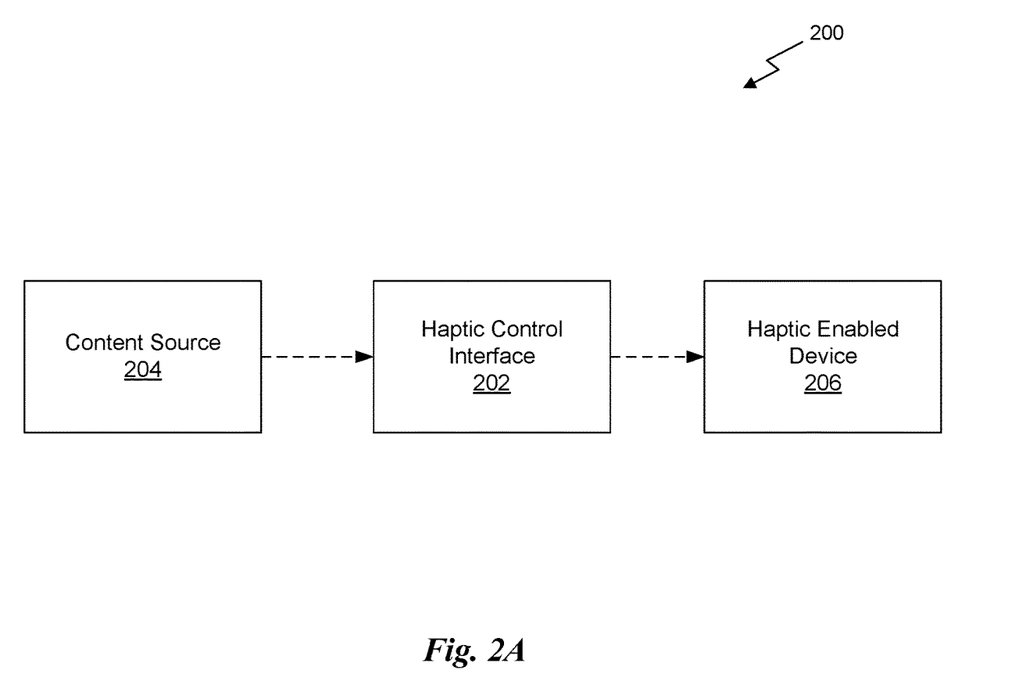
FIG. 2A illustrates a block diagram of a system including a haptic control interface, in accordance with an embodiment.

FIG. 2A illustrates a block diagram of a system 200 including a haptic control interface 202, in accordance with an embodiment. The haptic control interface 202 of the system 200 may be implemented to execute the method 100 of FIG. 1. Further, the haptic control interface 202 may be included in a subsystem of the overall system 200 shown. For example, the haptic control interface 202 may execute on a client device (e.g. video game console, cable TV console, client computer, etc.) or server device (e.g. located in the cloud).

As shown, the haptic control interface 202 is in communication with a content source 204. The content source 204 is computer system that stores content or otherwise outputs content (e.g. video and/or audio) for viewing/listening by a user. In an embodiment, the content source 204 is a client device (e.g. video game console, cable box, or other user device). In another embodiment, the content source 204 is a server device (e.g. cloud server). The haptic control interface 202 may be in direct (wired) or wireless communication with the content source 204.

The haptic control interface 202 receives a portion of content from the content source 204 (e.g. by intercepting the portion of content or receiving the portion of content directly from the content source). The haptic control interface 202 then uses a machine learning algorithm to process the portion of content and detect a feature of the content. The machine learning algorithm may be a component of the haptic control interface 202, in one embodiment, or may be external to the haptic control interface 202, in another embodiment. Further, the haptic control interface 202 determines one or more haptic effects for the feature.

As also shown, the haptic control interface 202 is in communication with a haptic enabled device 206. Of course, it should be noted that the haptic control interface 202 may similarly be in communication with multiple haptic enabled devices. The haptic enabled device 206 may be a remote controller, headphones, or any other device having one or more haptic motors included therein. The haptic enabled device 206 may be used by a user in conjunction with viewing, listening to, and/or interacting with the content output by the content source 204. In various embodiments, the haptic control interface 202 may be in direct (wired) or wireless communication with the haptic enabled device 206.

The haptic control interface 202 causes the haptic enabled device 206 to exhibit the one or more haptic effects determined for the detected feature of the content. For example, the haptic control interface 202 may instruct or signal the haptic enabled device 206 to perform the one or more haptic effects. In this way, the haptic control interface 202 may interface both the content source 204 and the haptic enabled device 206 to intelligently provide haptic effects for the content.

It should be noted that while the haptic control interface 202 is shown as interfacing a single content source 204 and a single haptic enabled device 206, in other embodiments the haptic control interface 202 may interface multiple content sources and/or multiple haptic enabled devices. Accordingly, the haptic control interface 202 may not necessarily be configured specifically for any one content source or any single piece of content, but instead may be similarly utilized across different content possibly sourced from different content sources. Moreover, the haptic control interface 202 may not necessarily be limited to controlling a single haptic enabled device 206, but instead may be configured to cause haptic effects in any number of different haptic enabled devices.

Figure 2B:
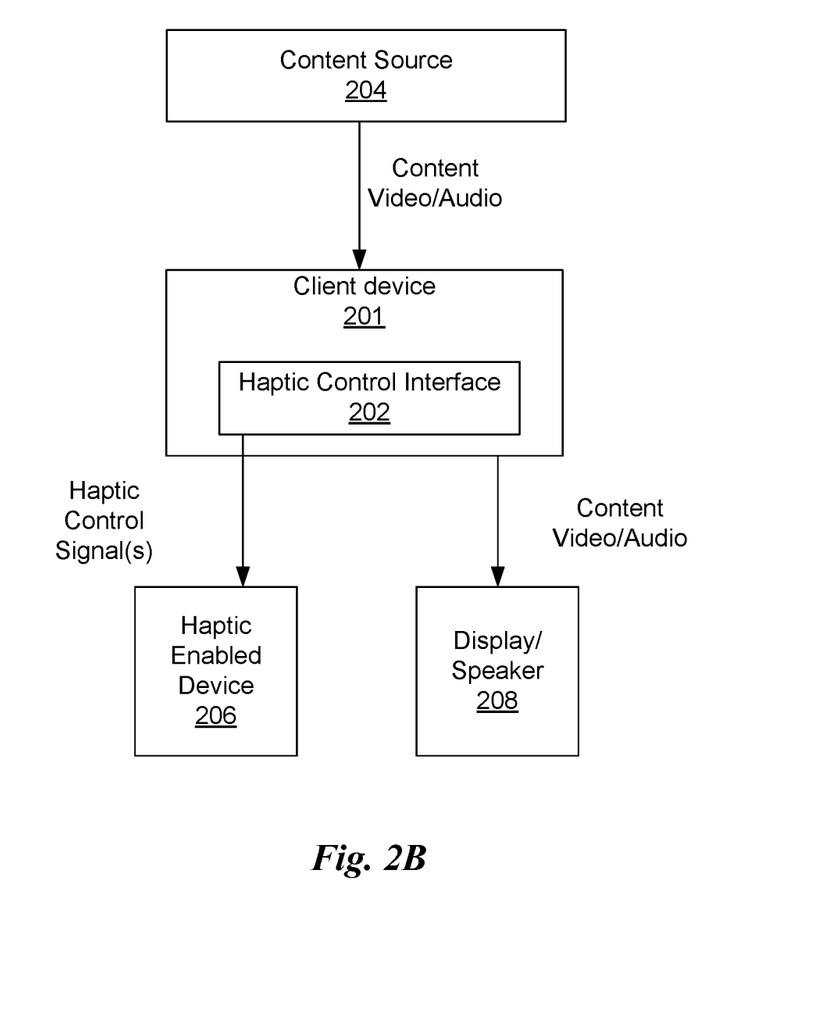
FIG. 2B illustrates a communication path involving the haptic control interface of FIG. 2A, in accordance with an embodiment.

FIG. 2B illustrates a communication path involving the haptic control interface of FIG. 2A, in accordance with an embodiment. The communication path represents an embodiment where the haptic control interface 202 is executing on a client device.

As shown, a content source 204 outputs content to the client device 201. The content may be video and/or audio, for example. In an embodiment, the content source 204 may be a cloud-based server storing and/or executing the content. The client device 201 may receive the content from the content source 204 for outputting the same to the user, as described in more detail below.

The client device 201 includes the haptic control interface 202 installed thereon. Upon the client device 201 receiving the content, or a portion thereof, from the content source 204, the haptic control interface 202 receives or otherwise identifies the portion of the content and processes the portion of the content using a machine learning algorithm to detect a feature of the content. The haptic control interface 202 then determines one or more haptic effect(s) for the feature.

Furthermore, the haptic control interface 202 causes a haptic enabled device 206 to exhibit the haptic effect(s) in conjunction with the feature being displayed or otherwise output to the user. As shown, the haptic control interface 202 outputs a haptic control signal to the haptic enabled device 206 to perform the haptic effect(s). In addition, the client device 201 outputs the content video and/or audio received from the content source 204 to a display and/or speaker 208 for output thereof to the user. Accordingly, the haptic control signal and the content video and/or audio may be output to the haptic enabled device 206 and the display and/or speaker 208, respectively, such that the haptic effect(s) are provided coincidently with the display and/or audible output of the feature of the content to the user.

Figure 2C:
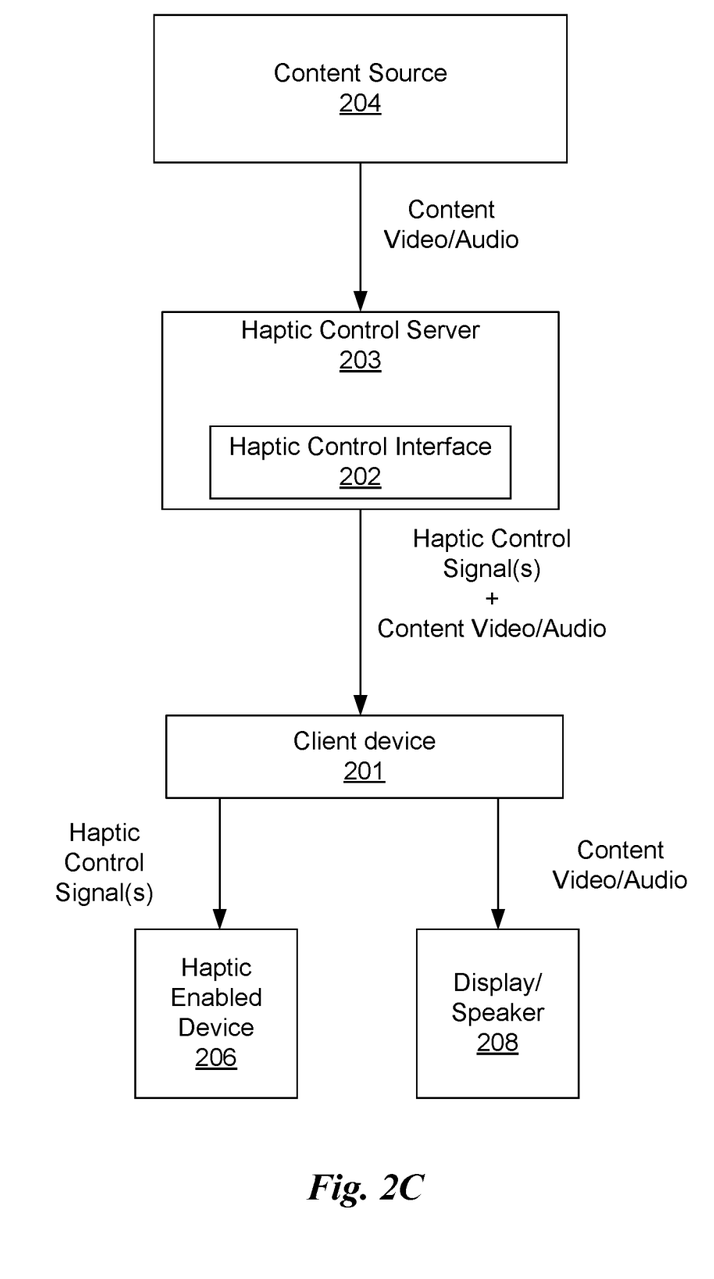
FIG. 2C illustrates another communication path involving the haptic control interface of FIG. 2A, in accordance with an embodiment.

FIG. 2C illustrates another communication path involving the haptic control interface of FIG. 2A, in accordance with an embodiment. The communication path of FIG. 2C provides increased latency with respect to the communication path of FIG. 2B by executing the haptic control interface 202 on a haptic control server 203, but eliminates resource utilization of the client device 201 for executing the haptic control interface.

Similar to FIG. 2B, the haptic control interface 202 receives a portion of content output by a content source 204. However, as noted above, the haptic control interface 202 executes on a haptic control server 203 which may be a cloud-based server. Once the haptic control interface 202 detects a feature of the content and determines a haptic effect(s) for the feature, the haptic control server 203 outputs a corresponding haptic control signal and the content to the client device 201.

The client device 201 then outputs the haptic control signal to the haptic enabled device 206 to perform the haptic effect(s). In addition, the client device 201 outputs the content to a display and/or speaker 208 for output thereof to the user. Similar to FIG. 2B, the haptic control signal and the content may be output to the haptic enabled device 206 and the display and/or speaker 208, respectively, such that the haptic effect(s) are provided coincidently with the display and/or audible output of the feature of the content to the user.

Exemplary Gaming Embodiment—2

In an embodiment, the haptic control interface 202 may interface a video game and a remote controller of a user. The haptic control interface receives a portion of the video game, which is a segment of video within the video game.

Responsive to receipt of the video segment, the video segment is processed using a machine learning algorithm to detect a feature of (e.g. event occurring within) the video game. As noted above, the machine learning algorithm may be configured to consider a type of the video game when detecting the feature. If no feature is detected, a next received video segment may be processed using the machine learning algorithm. However, in the present example, a gunshot may be detected as the feature of the video segment based on the flash or recoil included in the video segment.

Responsive to detection of the feature, one or more haptic effects are determined for the feature. The haptic effects may be predefined to correspond with the feature, such as a particular haptic effect for the gunshot. The haptic control interface 202 then causes the remote controller to provide the determined haptic effect(s), thus coordinating the haptic effect(s) experienced by the user with the gunshot experienced by the user within the video game.

Figure 3:
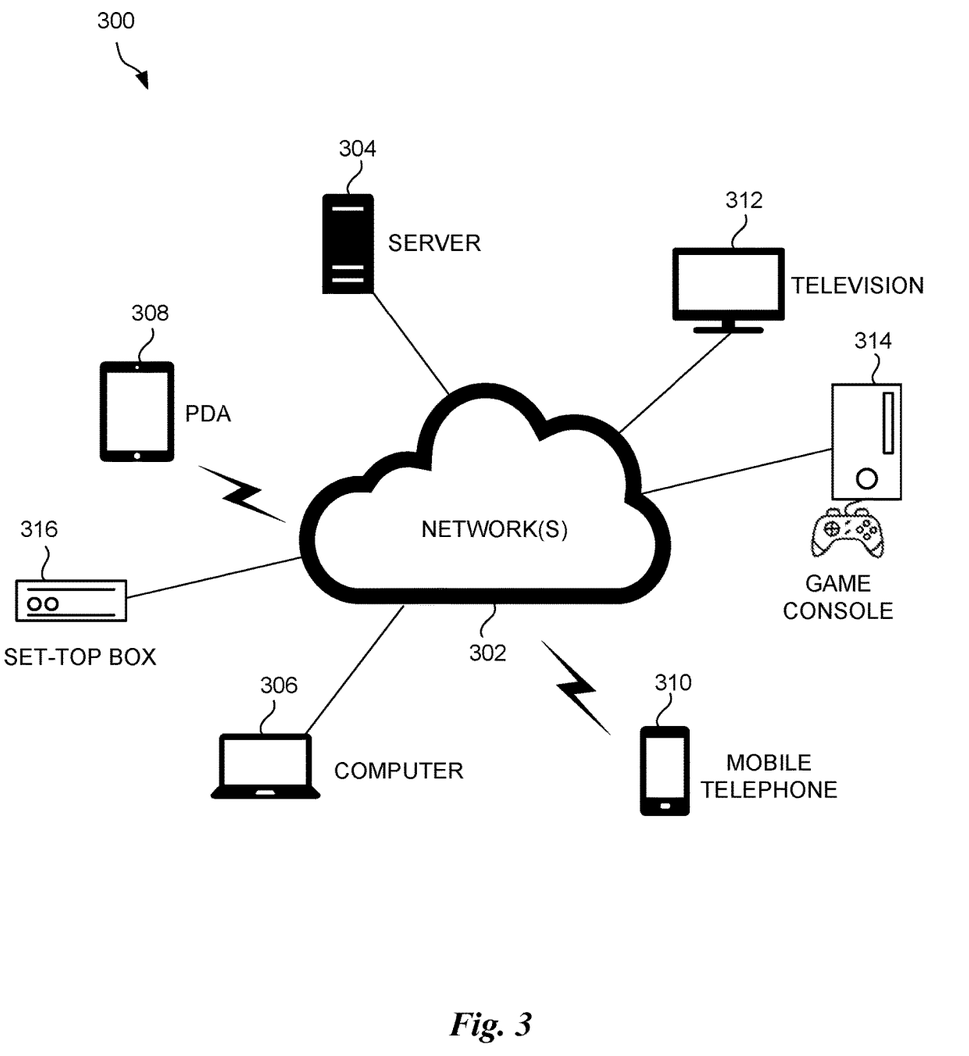
FIG. 3 illustrates a network architecture, in accordance with an embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, a game console 314, a television set-top box 316, etc.

Figure 4:
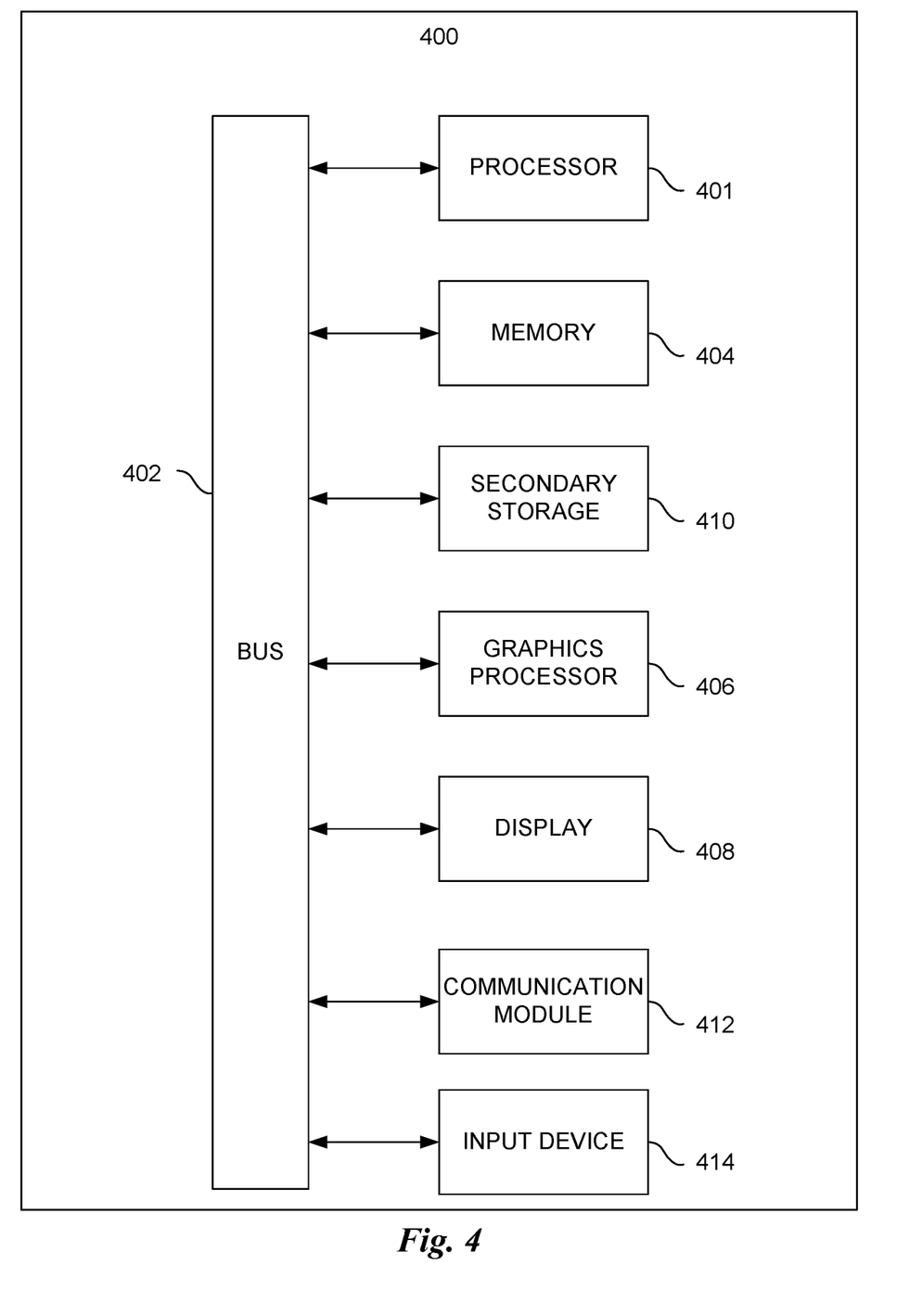
FIG. 4 illustrates an exemplary system, in accordance with an embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As also shown, the system 400 may include one or more input devices. The input devices may be wired or wireless input device. In various embodiments, each input device may include a keyboard, touch pad, touch screen, game controller (e.g. to a game console), remote controller (e.g. to a set-top box or television), or any other device capable of being used by a user to provide input to the system 400.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

Figure 5A:
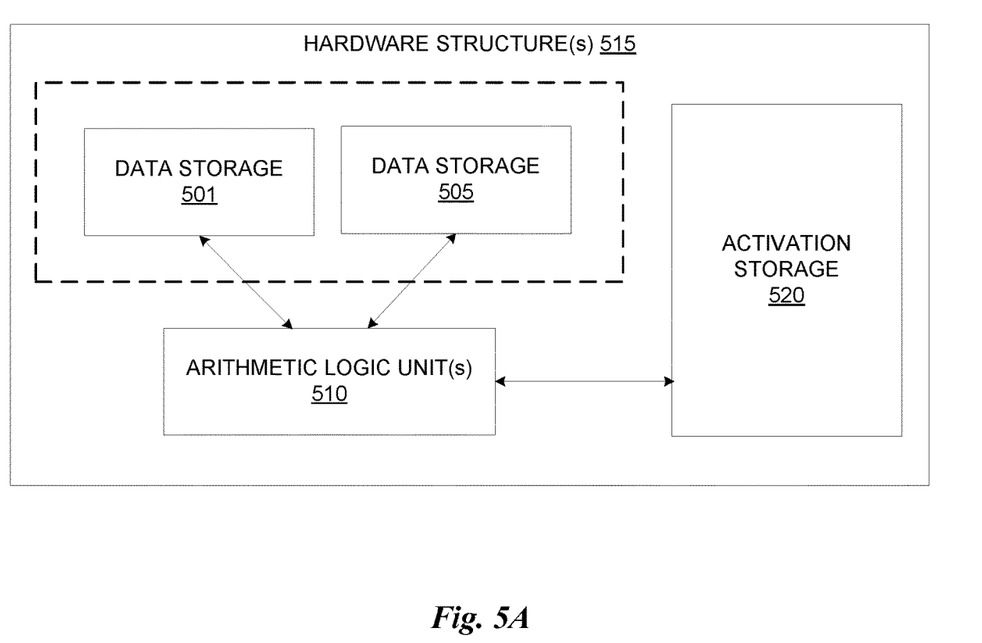
FIG. 5A illustrates inference and/or training logic, in accordance with an embodiment.
Figure 5B:
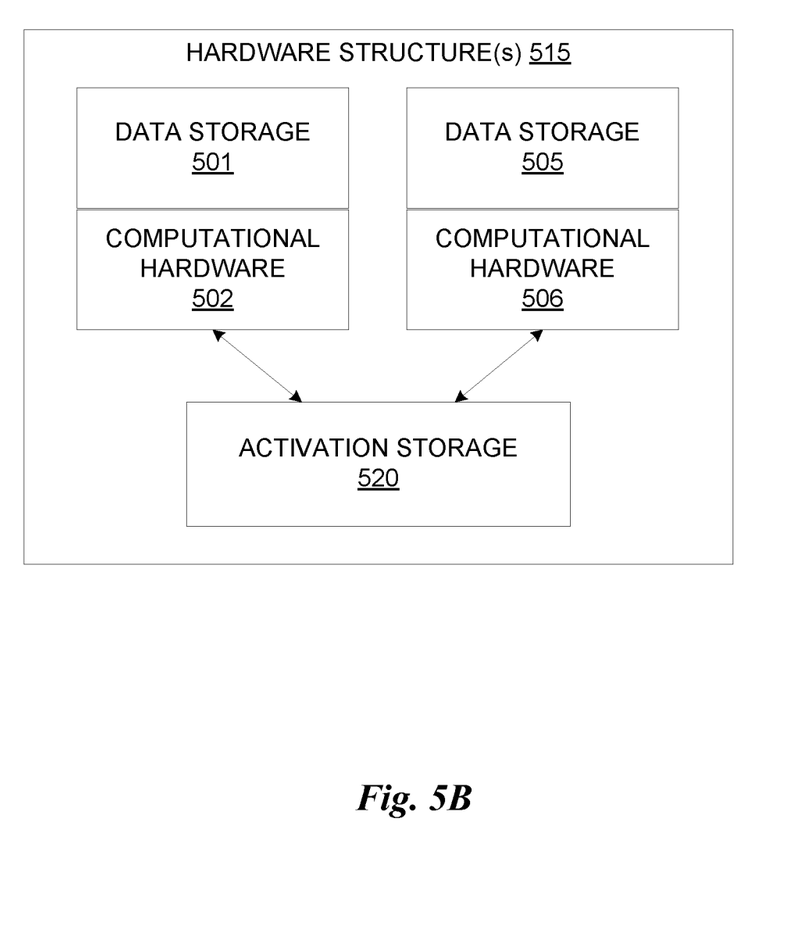
FIG. 5B illustrates inference and/or training logic, in accordance with an embodiment.

As noted above, a deep learning or neural learning system needs to be trained to generate inferences from input data. Details regarding inference and/or training logic 515 for a deep learning or neural learning system are provided below in conjunction with FIGS. 5A and/or 5B.

In at least one embodiment, inference and/or training logic 515 may include, without limitation, a data storage 501 to store forward and/or output weight and/or input/output data corresponding to neurons or layers of a neural network trained and/or used for inferencing in aspects of one or more embodiments. In at least one embodiment data storage 501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 501 may be included with other on-chip or off-chip data storage, including a processor's L1, L2, or L3 cache or system memory.

In at least one embodiment, any portion of data storage 501 may be internal or external to one or more processors or other hardware logic devices or circuits. In at least one embodiment, data storage 501 may be cache memory, dynamic randomly addressable memory ("DRAM"), static randomly addressable memory ("SRAM"), non-volatile memory (e.g., Flash memory), or other storage. In at least one embodiment, choice of whether data storage 501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 515 may include, without limitation, a data storage 505 to store backward and/or output weight and/or input/output data corresponding to neurons or layers of a neural network trained and/or used for inferencing in aspects of one or more embodiments. In at least one embodiment, data storage 505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 505 may be included with other on-chip or off-chip data storage, including a processor's L1, L2, or L3 cache or system memory. In at least one embodiment, any portion of data storage 505 may be internal or external to on one or more processors or other hardware logic devices or circuits. In at least one embodiment, data storage 505 may be cache memory, DRAM, SRAM, non-volatile memory (e.g., Flash memory), or other storage. In at least one embodiment, choice of whether data storage 505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 501 and data storage 505 may be separate storage structures. In at least one embodiment, data storage 501 and data storage 505 may be same storage structure. In at least one embodiment, data storage 501 and data storage 505 may be partially same storage structure and partially separate storage structures. In at least one embodiment, any portion of data storage 501 and data storage 505 may be included with other on-chip or off-chip data storage, including a processor's L1, L2, or L3 cache or system memory.

In at least one embodiment, inference and/or training logic 515 may include, without limitation, one or more arithmetic logic unit(s) ("ALU(s)") 510 to perform logical and/or mathematical operations based, at least in part on, or indicated by, training and/or inference code, result of which may result in activations (e.g., output values from layers or neurons within a neural network) stored in an activation storage 520 that are functions of input/output and/or weight parameter data stored in data storage 501 and/or data storage 505. In at least one embodiment, activations stored in activation storage 520 are generated according to linear algebraic and or matrix-based mathematics performed by ALU(s) 510 in response to performing instructions or other code, wherein weight values stored in data storage 505 and/or data 501 are used as operands along with other values, such as bias values, gradient information, momentum values, or other parameters or hyperparameters, any or all of which may be stored in data storage 505 or data storage 501 or another storage on or off-chip. In at least one embodiment, ALU(s) 510 are included within one or more processors or other hardware logic devices or circuits, whereas in another embodiment, ALU(s) 510 may be external to a processor or other hardware logic device or circuit that uses them (e.g., a co-processor). In at least one embodiment, ALUs 510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 501, data storage 505, and activation storage 520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 520 may be cache memory, DRAM, SRAM, non-volatile memory (e.g., Flash memory), or other storage. In at least one embodiment, activation storage 520 may be completely or partially within or external to one or more processors or other logical circuits. In at least one embodiment, choice of whether activation storage 520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 515 illustrated in FIG. 5A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5A may be used in conjunction with central processing unit ("CPU") hardware, graphics processing unit ("GPU") hardware or other hardware, such as field programmable gate arrays ("FPGAs").

FIG. 5B illustrates inference and/or training logic 515, according to at least one embodiment. In at least one embodiment, inference and/or training logic 515 may include, without limitation, hardware logic in which computational resources are dedicated or otherwise exclusively used in conjunction with weight values or other information corresponding to one or more layers of neurons within a neural network. In at least one embodiment, inference and/or training logic 515 illustrated in FIG. 5B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5B may be used in conjunction with central processing unit (CPU) hardware, graphics processing unit (GPU) hardware or other hardware, such as field programmable gate arrays (FPGAs). In at least one embodiment, inference and/or training logic 515 includes, without limitation, data storage 501 and data storage 505, which may be used to store weight values and/or other information, including bias values, gradient information, momentum values, and/or other parameter or hyperparameter information. In at least one embodiment illustrated in FIG. 5B, each of data storage 501 and data storage 505 is associated with a dedicated computational resource, such as computational hardware 502 and computational hardware 506, respectively. In at least one embodiment, each of computational hardware 506 comprises one or more ALUs that perform mathematical functions, such as linear algebraic functions, only on information stored in data storage 501 and data storage 505, respectively, result of which is stored in activation storage 520.

In at least one embodiment, each of data storage 501 and 505 and corresponding computational hardware 502 and 506, respectively, correspond to different layers of a neural network, such that resulting activation from one "storage/computational pair 501/502" of data storage 501 and computational hardware 502 is provided as an input to next "storage/computational pair 505/506" of data storage 505 and computational hardware 506, in order to mirror conceptual organization of a neural network. In at least one embodiment, each of storage/computational pairs 501/502 and 505/506 may correspond to more than one neural network layer. In at least one embodiment, additional storage/computation pairs (not shown) subsequent to or in parallel with storage computation pairs 501/502 and 505/506 may be included in inference and/or training logic 515.

Neural Network Training and Deployment

Figure 6:
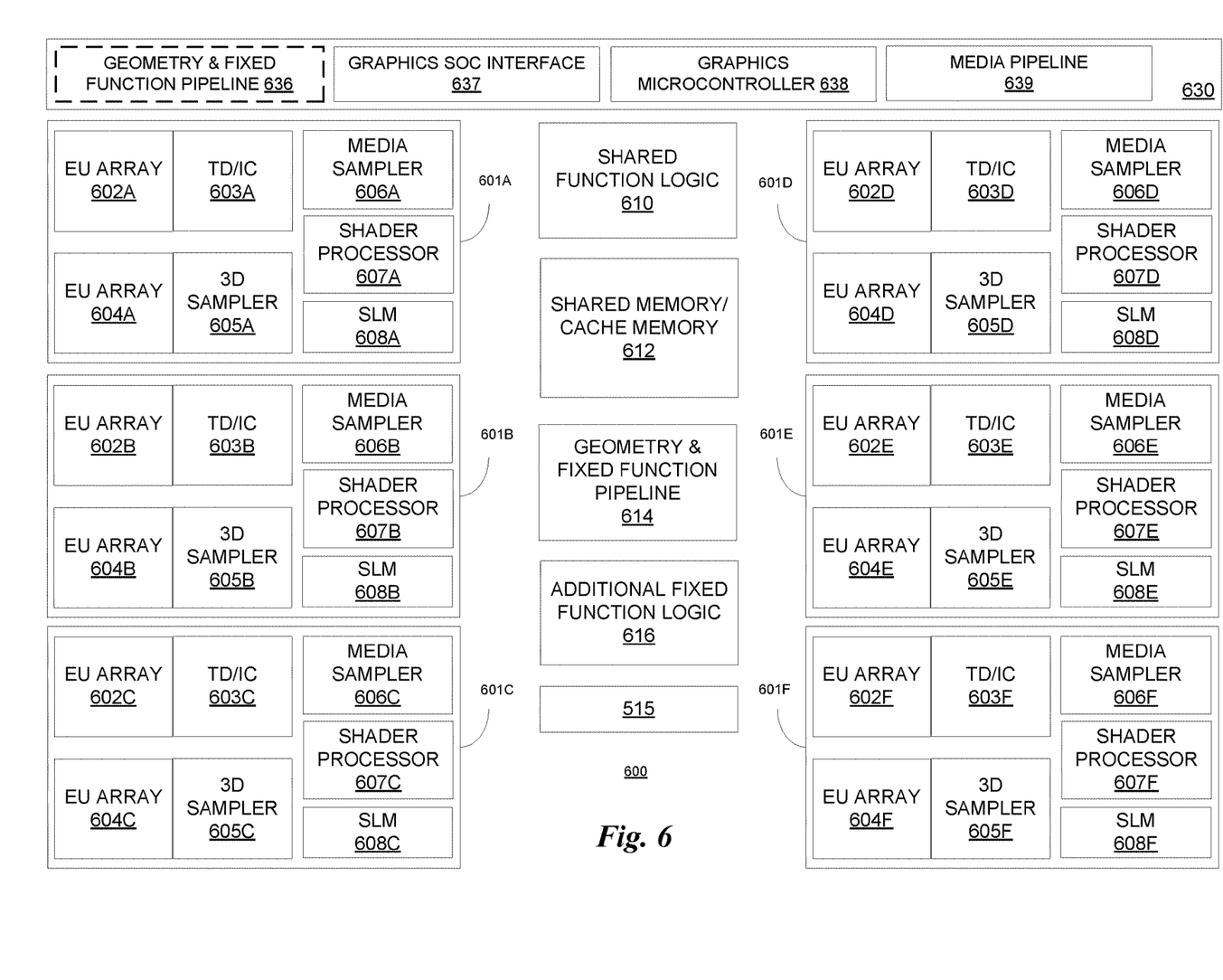
FIG. 6 illustrates training and deployment of a neural network, in accordance with an embodiment.

FIG. 6 illustrates another embodiment for training and deployment of a deep neural network. In at least one embodiment, untrained neural network 606 is trained using a training dataset 602. In at least one embodiment, training framework 604 is a PyTorch framework, whereas in other embodiments, training framework 604 is a Tensorflow, Boost, Caffe, Microsoft Cognitive Toolkit/CNTK, MXNet, Chainer, Keras, Deeplearning4j, or other training framework. In at least one embodiment training framework 604 trains an untrained neural network 606 and enables it to be trained using processing resources described herein to generate a trained neural network 608. In at least one embodiment, weights may be chosen randomly or by pre-training using a deep belief network. In at least one embodiment, training may be performed in either a supervised, partially supervised, or unsupervised manner.

In at least one embodiment, untrained neural network 606 is trained using supervised learning, wherein training dataset 602 includes an input paired with a desired output for an input, or where training dataset 602 includes input having known output and the output of the neural network is manually graded. In at least one embodiment, untrained neural network 606 is trained in a supervised manner processes inputs from training dataset 602 and compares resulting outputs against a set of expected or desired outputs. In at least one embodiment, errors are then propagated back through untrained neural network 606. In at least one embodiment, training framework 604 adjusts weights that control untrained neural network 606. In at least one embodiment, training framework 604 includes tools to monitor how well untrained neural network 606 is converging towards a model, such as trained neural network 608, suitable to generating correct answers, such as in result 614, based on known input data, such as new data 612. In at least one embodiment, training framework 604 trains untrained neural network 606 repeatedly while adjust weights to refine an output of untrained neural network 606 using a loss function and adjustment algorithm, such as stochastic gradient descent. In at least one embodiment, training framework 604 trains untrained neural network 606 until untrained neural network 606 achieves a desired accuracy. In at least one embodiment, trained neural network 608 can then be deployed to implement any number of machine learning operations.

In at least one embodiment, untrained neural network 606 is trained using unsupervised learning, wherein untrained neural network 606 attempts to train itself using unlabeled data. In at least one embodiment, unsupervised learning training dataset 602 will include input data without any associated output data or "ground truth" data. In at least one embodiment, untrained neural network 606 can learn groupings within training dataset 602 and can determine how individual inputs are related to untrained dataset 602. In at least one embodiment, unsupervised training can be used to generate a self-organizing map, which is a type of trained neural network 608 capable of performing operations useful in reducing dimensionality of new data 612. In at least one embodiment, unsupervised training can also be used to perform anomaly detection, which allows identification of data points in a new dataset 612 that deviate from normal patterns of new dataset 612.

In at least one embodiment, semi-supervised learning may be used, which is a technique in which in training dataset 602 includes a mix of labeled and unlabeled data. In at least one embodiment, training framework 604 may be used to perform incremental learning, such as through transferred learning techniques. In at least one embodiment, incremental learning enables trained neural network 608 to adapt to new data 612 without forgetting knowledge instilled within network during initial training.

As described herein, a method, computer readable medium, and system are disclosed to provide a haptic control interface for detecting content features using machine learning to induce haptic effects. In accordance with FIGS. 1-2C, an embodiment may provide a machine learning model usable by the haptic control interface, where the machine learning model is stored (partially or wholly) in one or both of data storage 501 and 505 in inference and/or training logic 515 as depicted in FIGS. 5A and 5B. Training and deployment of the machine learning model may be performed as depicted in FIG. 6 and described herein.

What is claimed is:

1. A method, comprising:
receiving, by a content-agnostic, cloud-based haptic control interface remotely interfacing each of a content source and a haptic enabled device of a client device, a portion of content;
processing, by the haptic control interface, the portion of content using a machine learning algorithm to detect a feature of the content;
querying, by the haptic control interface, a library of haptic effects using the feature of the content to determine one or more haptic effects predefined for the feature in the library;
causing, by the haptic control interface, the haptic enabled device to exhibit the one or more haptic effects determined for the feature.

2. The method of claim 1, wherein the content is a video game.

3. The method of claim 1, wherein the content is a movie.

4. The method of claim 1, wherein the portion of content is a video segment.

5. The method of claim 1, wherein the portion of content is an audio segment.

6. The method of claim 1, wherein the content source is configured to provide the portion of content to the haptic control interface.

7. The method of claim 1, wherein the haptic control interface intercepts the portion of content output by the content source.

8. The method of claim 1, wherein the machine learning algorithm is initially trained using training data, the training data providing a predefined correlation between characteristics of content and particular features.

9. The method of claim 1, wherein the feature is an event within the content.

10. The method of claim 1, wherein the machine learning algorithm is trained to detect a feature of the content based on a context of the content.

11. The method of claim 10, wherein the context of the content is a type or genre of the content.

12. The method of claim 1, wherein the one or more haptic effects are determined for a particular haptic motor of the haptic enabled device.

13. The method of claim 1, wherein the haptic enabled device is a remote controller.

14. The method of claim 1, wherein the haptic enabled device is headphones.

15. The method of claim 1, wherein causing the haptic enabled device to exhibit the one or more haptic effects determined for the feature includes sending a haptic command or signal to a haptic motor of the haptic enabled device.

16. A system, comprising:
a processor executing a content-agnostic, cloud-based haptic control interface, wherein the haptic control interface remotely interfaces a content source and a haptic enabled device of a client device, and wherein the haptic control interface is executed to perform a method comprising:
receiving a portion of content;
processing the portion of content using a machine learning algorithm to detect a feature of the content;
querying a library of haptic effects using the feature of the content to determine one or more haptic effects predefined for the feature in the library;
causing the haptic enabled device to exhibit the one or more haptic effects determined for the feature.

17. The system of claim 16, wherein the portion of the content is one of a video segment or an audio segment.

18. The system of claim 16, wherein the feature is an event within the content.

19. A non-transitory computer-readable media storing computer instructions which when executed by one or more processors cause the one or more processors to perform a method comprising:
receiving, by a content-agnostic, cloud-based haptic control interface remotely interfacing each of a content source and a haptic enabled device of a client device, a portion of content;
processing, by the haptic control interface, the portion of content using a machine learning algorithm to detect a feature of the content;
querying, by the haptic control interface, a library of haptic effects using the feature of the content to determine one or more haptic effects predefined for the feature in the library;
causing, by the haptic control interface, the haptic enabled device to exhibit the one or more haptic effects determined for the feature.

20. The method of claim 1, wherein the haptic control interface is configured to cause haptic effects in a plurality of different haptic enabled devices for a plurality of different pieces of content provided by a plurality of different content sources.

21. The method of claim 1, wherein the machine learning algorithm processes the portion of content to detect the feature of the content, based on a genre of the content.

* * * * *